(12) United States Patent
Kubo et al.

(10) Patent No.: US 12,035,215 B2
(45) Date of Patent: Jul. 9, 2024

(54) COMMUNICATION DEVICE, NON-TRANSITORY COMPUTER READABLE STORAGE MEDIUM, AND SYSTEM

(71) Applicant: KABUSHIKI KAISHA TOKAI RIKA DENKI SEISAKUSHO, Aichi (JP)

(72) Inventors: Yutaka Kubo, Aichi (JP); Tadashi Fukagai, Aichi (JP); Masateru Furuta, Aichi (JP); Yuki Kono, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/585,032

(22) Filed: Jan. 26, 2022

(65) Prior Publication Data

US 2022/0295251 A1 Sep. 15, 2022

(30) Foreign Application Priority Data

Mar. 9, 2021 (JP) ................................. 2021-037582

(51) Int. Cl.
*H04W 4/80* (2018.01)
*H04W 4/02* (2018.01)

(52) U.S. Cl.
CPC ............. *H04W 4/80* (2018.02); *H04W 4/023* (2013.01)

(58) Field of Classification Search
CPC ................................ H04W 4/80; H04W 4/023
USPC ....................................................... 455/147
See application file for complete search history.

(56) References Cited

U.S. PATENT DOCUMENTS

| 9,014,648 | B2* | 4/2015 | Gudem | H04B 7/0871 |
| | | | | 455/147 |
| 11,449,799 | B1* | 9/2022 | Arbajian | H04L 9/3247 |
| 2017/0236351 | A1* | 8/2017 | Menard | G01S 13/0209 |
| | | | | 340/5.61 |
| 2018/0099643 | A1* | 4/2018 | Golsch | G01S 13/765 |
| 2019/0256047 | A1* | 8/2019 | Iwashita | G01S 13/0209 |

(Continued)

FOREIGN PATENT DOCUMENTS

JP 2018-071190 5/2018

*Primary Examiner* — April G Gonzales
(74) *Attorney, Agent, or Firm* — GREENBLUM & BERNSTEIN, P.L.C.

(57) ABSTRACT

There is provided a communication device comprising: a BLE communication section configured to perform BLE communication with another communication device different from the communication device, the BLE communication being wireless communication conforming to BLE communication standards; a UWB communication section configured to perform UWB communication with the another communication device, the UWB communication being wireless communication conforming to UWB communication standards; and a control section configured to control the BLE communication of the BLE communication section and the UWB communication of the UWB communication section, wherein the control section performs control to start the UWB communication based on a response signal transmitted by one of the BLE communication section and the another communication device as a response to a request signal transmitted by other one of the BLE communication section and the another communication device during the BLE communication.

12 Claims, 3 Drawing Sheets

(56) References Cited

U.S. PATENT DOCUMENTS

| | | | |
|---|---|---|---|
| 2020/0064444 A1* | 2/2020 | Regani | G01S 7/417 |
| 2020/0198580 A1* | 6/2020 | Saleh | B60R 25/24 |
| 2020/0228943 A1* | 7/2020 | Martin | H04W 4/80 |
| 2020/0319324 A1* | 10/2020 | Au | H04W 48/16 |
| 2021/0058252 A1* | 2/2021 | Jung | H04L 9/3263 |

* cited by examiner

COMMUNICATION DEVICE, NON-TRANSITORY COMPUTER READABLE STORAGE MEDIUM, AND SYSTEM

CROSS REFERENCE TO RELATED APPLICATION(S)

This application is based upon and claims benefit of priority from Japanese Patent Application No. 2021-037582, filed on Mar. 9, 2021, the entire contents of which are incorporated herein by reference.

BACKGROUND

The present invention relates to a communication device, a non-transitory computer readable storage medium, and a system.

In recent years, a technology that performs authentication according to a result of transmission and reception of signals between devices has been developed. For example, following JP2018-71190A discloses a system in which in-vehicle equipment authenticates a portable device by transmitting and receiving signals to and from the portable device, and controls a vehicle according to a result of the authentication.

SUMMARY

The system disclosed in JP2018-71190A performs distance measurement for calculating a distance between the in-vehicle equipment and the portable device by Ultra Wide Band (UWB) wireless communication, and uses an obtained distance measurement value for authentication. To perform such distance measurement, it is demanded to make one of the in-vehicle equipment and the portable device stand by in a state where the in-vehicle equipment or the portable device can receive a signal. However, as the above-described standby time becomes longer, power consumption increases.

Therefore, the present invention has been made in light of the above problem, and an object of the present invention is to effectively suppress power consumption required for UWB communication.

To solve the above-described problems, according to an aspect of the present invention, there is provided a communication device comprising: a BLE communication section configured to perform BLE communication with another communication device different from the communication device, the BLE communication being wireless communication conforming to BLE communication standards; a UWB communication section configured to perform UWB communication with the another communication device, the UWB communication being wireless communication conforming to UWB communication standards; and a control section configured to control the BLE communication of the BLE communication section and the UWB communication of the UWB communication section, wherein the control section performs control to start the UWB communication based on a response signal transmitted by one of the BLE communication section and the another communication device as a response to a request signal transmitted by other one of the BLE communication section and the another communication device during the BLE communication.

In addition, to solve the above-described problems, according to another aspect of the present invention, there is provided a non-transitory computer readable storage medium having a program stored therein, the program causing a computer to realize: a BLE communication function configured to perform BLE communication with another communication device, the BLE communication being wireless communication conforming to BLE communication standards; a UWB communication function configured to perform UWB communication with the another communication device, the UWB communication being wireless communication conforming to UWB communication standards; and a control function configured to control the BLE communication and the UWB communication, wherein the program causes the control function to perform control to start the UWB communication based on a response signal transmitted by one of the BLE communication function and the another communication device as a response to a request signal transmitted by other one of the BLE communication function and the another communication device during the BLE communication.

In addition, to solve the above-described problems, according to another aspect of the present invention, there is provided a system comprising: a first communication device; and a second communication device, wherein the first communication device includes a BLE communication section configured to perform BLE communication with the second communication device, the BLE communication being wireless communication conforming to BLE communication standards; a UWB communication section configured to perform UWB communication with the second communication device, the UWB communication being wireless communication conforming to UWB communication standards; and a control section configured to control the BLE communication of the BLE communication section and the UWB communication of the UWB communication section, and the control section performs control to start the UWB communication based on a response signal transmitted by one of the BLE communication section and the second communication device as a response to a request signal transmitted by other one of the BLE communication section and the second communication device during the BLE communication.

As described above, according to the present invention, it is possible to effectively suppress power consumption required for UWB communication.

DETAILED DESCRIPTION OF THE EMBODIMENT(S)

Figure 1:
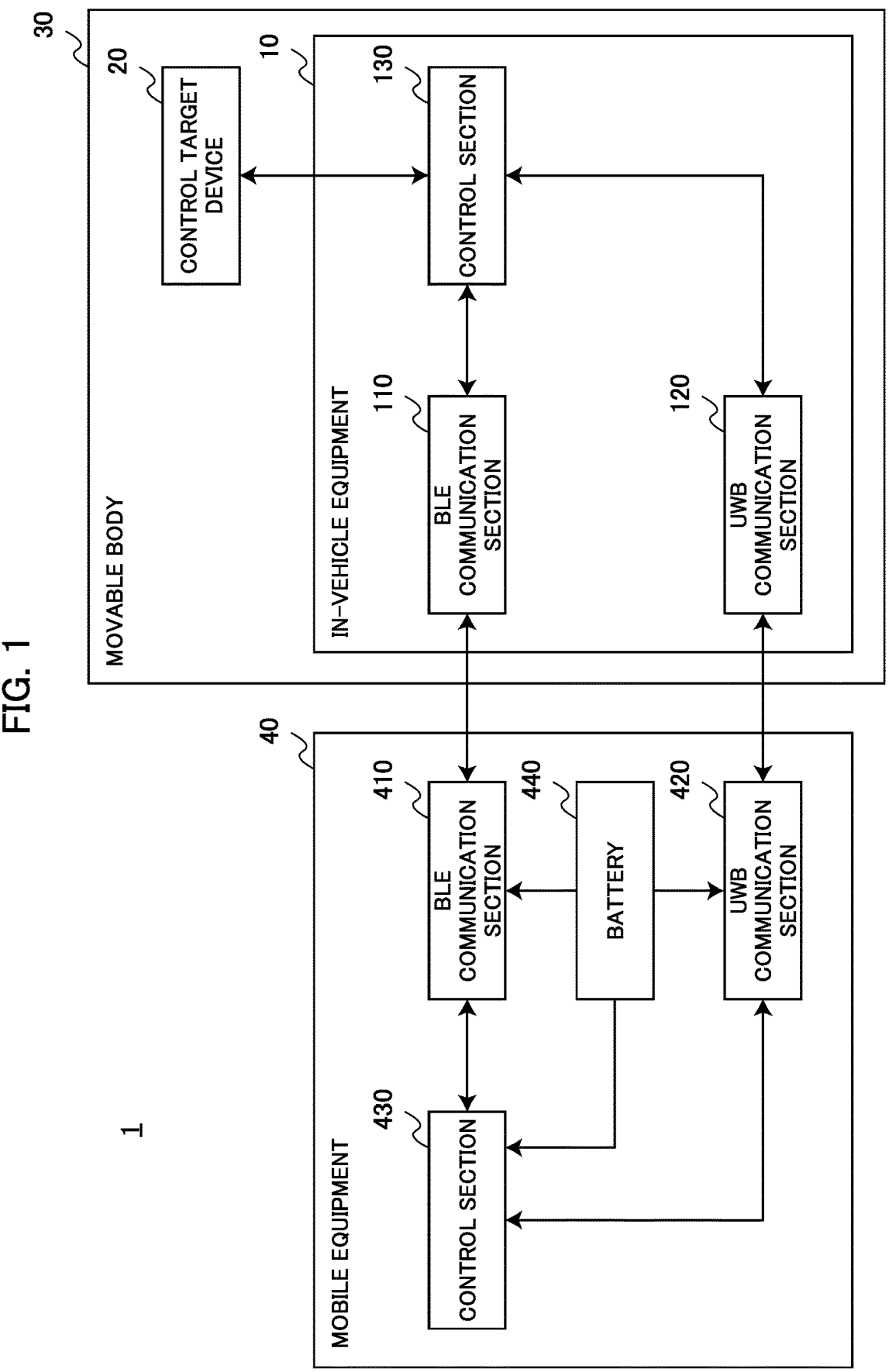
FIG. 1 is a block diagram illustrating a configuration example of a system 1 according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Embodiment

<<1.1. System Configuration Example>>

First, a configuration example of a system 1 according to an embodiment of the present invention will be described.

FIG. 1 is a block diagram illustrating the configuration example of the system 1 according to the present embodiment.

As illustrated in FIG. 1, the system 1 according to the present embodiment may include in-vehicle equipment 10 and a control target device 20 that are mounted on a movable body 30 such as a vehicle.

Furthermore, as illustrated in FIG. 1, the system 1 according to the present embodiment may include mobile equipment 40.

(In-Vehicle Equipment 10)

The in-vehicle equipment 10 according to the present embodiment is an example of a communication device that performs wireless communication with the mobile equipment 40.

As illustrated in FIG. 1, the in-vehicle equipment 10 according to the present embodiment may include a BLE communication section 110, a UWB communication section 120, and a control section 130.

(BLE Communication Section 110)

The BLE communication section 110 according to the present embodiment performs BLE communication that is wireless communication conforming to the Bluetooth (registered trademark) Low Energy (BLE) communication standards for the mobile equipment 40.

For this BLE communication, the BLE communication section 110 according to the present embodiment includes an antenna that can transmit and receive wireless signals conforming to the BLE communication standards.

(UWB Communication Section 120)

The UWB communication section 120 according to the present embodiment performs UWB communication that is wireless communication conforming to the UWB communication standards for the mobile equipment 40.

For this UWB communication, the UWB communication section 120 according to the present embodiment includes an antenna that can transmit and receive wireless signals conforming to the UWB communication standards.

(Control Section 130)

The control section 130 according to the present embodiment controls BLE communication of the BLE communication section 110 and UWB communication of the UWB communication section 120.

Furthermore, one of features of the control section 130 according to the present embodiment is that the control section 130 performs control to start UWB communication based on a response signal transmitted by one of the BLE communication section 110 and the mobile equipment 40 as a response to a request signal transmitted by other one of the BLE communication section 110 and the mobile equipment 40.

For example, the control section 130 according to the present embodiment may perform control to start UWB communication a fixed time after the BLE communication section 110 transmits or receives the above response signal.

According to the above-described control, it is possible to synchronize start timings of UWB communication between the in-vehicle equipment 10 and the mobile equipment 40, and effectively reduce a reception standby time and power consumption.

Furthermore, the control section 130 according to the present embodiment may control an operation of the control target device 20 mounted on the movable body 30 based on a result of a process based on UWB communication.

An example of the above process is a process of estimating a positional relationship between the UWB communication section 120 and the mobile equipment 40 (more specifically, UWB communication section 210).

The above process of estimating the positional relationship includes, for example, distance measurement for estimating a distance between the UWB communication section 120 and the mobile equipment 40 (more specifically, UWB communication section 210).

For example, the control section 130 according to the present embodiment may cause the control target device 20 to execute a predetermined operation when a result of the above process of estimating the positional relationship is within a predetermined range.

Functions of the control section 130 according to the present embodiment are realized by various processors. Details of the functions of the control section 130 according to the present embodiment will be separately described.

Note that the in-vehicle equipment 10 according to the present embodiment is driven by a battery (illustration thereof is omitted) mounted on the movable body 30.

(Control Target Device 20)

The control target device 20 according to the present embodiment is various devices that execute predetermined operations under control of the control section 130 of the in-vehicle equipment 10 mounted on the identical movable body 30.

Examples of the control target device 20 according to the present embodiment include a locking device that unlocks and locks a door equipped to the movable body 30, and an engine.

For example, the control section 130 of the in-vehicle equipment 10 may cause the above locking device to execute unlocking of the door as the predetermined operation when the result of the process of estimating the positional relationship is within the predetermined range.

Furthermore, for example, the control section 130 may cause the engine to execute starting as the predetermined operation when the result of the process of estimating the positional relationship is within the predetermined range.

According to the above-described control, it is possible to flexibly and precisely control the operation of the control target device 20 according to the positional relationship between the in-vehicle equipment 10 and the mobile equipment 40, and realize improvement of user friendliness and improvement of security.

Note that the control target device 20 according to the present embodiment is driven by the battery (illustration thereof is omitted) mounted on the movable body 30.

(Mobile Equipment 40)

The mobile equipment 40 according to the present embodiment is an example of a communication device that performs wireless communication with the in-vehicle equipment 10.

The mobile equipment 40 according to the present embodiment is carried by a user who uses the movable body 30 (e.g., an owner of the movable body 30 or a person who is permitted by the owner to use the movable body 30).

The mobile equipment 40 according to the present embodiment may be an information processing device such as a smartphone or a wearable device used for multiple purposes.

On the other hand, the mobile equipment 40 according to the present embodiment may be dedicated equipment that is manufactured for a purpose for use in the system 1.

As illustrated in FIG. 1, the mobile equipment 40 according to the present embodiment may include a BLE communication section 410, a UWB communication section 420, a control section 430, and a battery 440.

(BLE Communication Section 410)

The BLE communication section 410 according to the present embodiment performs BLE communication that is wireless communication conforming to the BLE communication standards for the in-vehicle equipment 10.

For this BLE communication, the BLE communication section 410 according to the present embodiment includes an antenna that can transmit and receive wireless signals conforming to the BLE communication standards.

(UWB Communication Section 420)

The UWB communication section 120 according to the present embodiment performs UWB communication that is wireless communication conforming to the UWB communication standards for the in-vehicle equipment 10.

For this UWB communication, the UWB communication section 420 according to the present embodiment includes an antenna that can transmit and receive wireless signals conforming to the UWB communication standards.

(Control Section 430)

The control section 430 according to the present embodiment controls BLE communication of the BLE communication section 410 and UWB communication of the UWB communication section 420.

Furthermore, one of the features of the control section 430 according to the present embodiment is that the control section 430 performs control to start UWB communication based on a response signal transmitted by one of the BLE communication section 410 and the in-vehicle equipment 10 as a response to a request signal transmitted by other one of the BLE communication section 410 and the in-vehicle equipment 10.

For example, the control section 430 according to the present embodiment may perform control to start UWB communication a fixed time after the BLE communication section 410 transmits or receives the above response signal.

According to the above-described control, it is possible to synchronize start timings of UWB communication between the in-vehicle equipment 10 and the mobile equipment 40, and effectively reduce a reception standby time and power consumption.

Functions of the control section 430 according to the present embodiment are realized by various processors.

(Battery 440)

The battery 440 according to the present embodiment supplies electric power to each component of the mobile equipment 40.

That is, the mobile equipment 40 according to the present embodiment is driven by the battery 440.

The battery 440 according to the present embodiment may be various primary batteries and secondary batteries.

The configuration example of the system 1 according to the present embodiment has been described above. Note that the above configuration described with reference to FIG. 1 is the mere example, and the configuration of the system 1 according to the present embodiment is not limited to this example. The configuration of the system 1 according to the present embodiment can be flexibly altered according to a specification or an operation.

<<1.2. Details of Control>>

Next, control in the system 1 according to the present embodiment will be described in detail.

As described above, the system 1 according to the present embodiment controls the operation of the control target device 20 based on a result of a process that uses UWB communication performed between the in-vehicle equipment 10 and the mobile equipment 40.

One of the features of the system 1 according to the present embodiment is that the system 1 synchronizes start timings of UWB communication between the in-vehicle equipment 10 and the mobile equipment 40 by using BLE communication that precedes UWB communication.

According to the above feature, it is possible to reduce a reception standby time on a side that is the in-vehicle equipment 10 or the mobile equipment 40 and receives a first signal of UWB communication, and, as a result, it is possible to effectively reduce power consumption on the reception side.

Note that, to realize the above-described feature, it is demanded to share key information used for encryption of UWB communication between the in-vehicle equipment 10 and the mobile equipment 40 by using BLE communication.

In this case, there is also assumed a method of establishing connection of BLE communication between the in-vehicle equipment 10 and the mobile equipment 40, and transmitting and receiving the above-described key information.

However, when connection of BLE communication is established, it is demanded to share an order of channels used for communication and information related to a communication cycle between the in-vehicle equipment 10 and the mobile equipment 40, and therefore both of the number of times of communication and a communication time increase, which causes a decrease in responsiveness of entire BLE communication.

Hence, the system 1 according to the present embodiment may share key information used for UWB communication by using a request signal and a response signal that is a response to the request signal without establishing connection of BLE communication.

An example of the above request signal is a scan request. Furthermore, an example of the above response signal is a scan response.

A communication sequence of the system 1 according to the present embodiment will be described below with reference to FIG. 2 citing an example.

Figure 2:
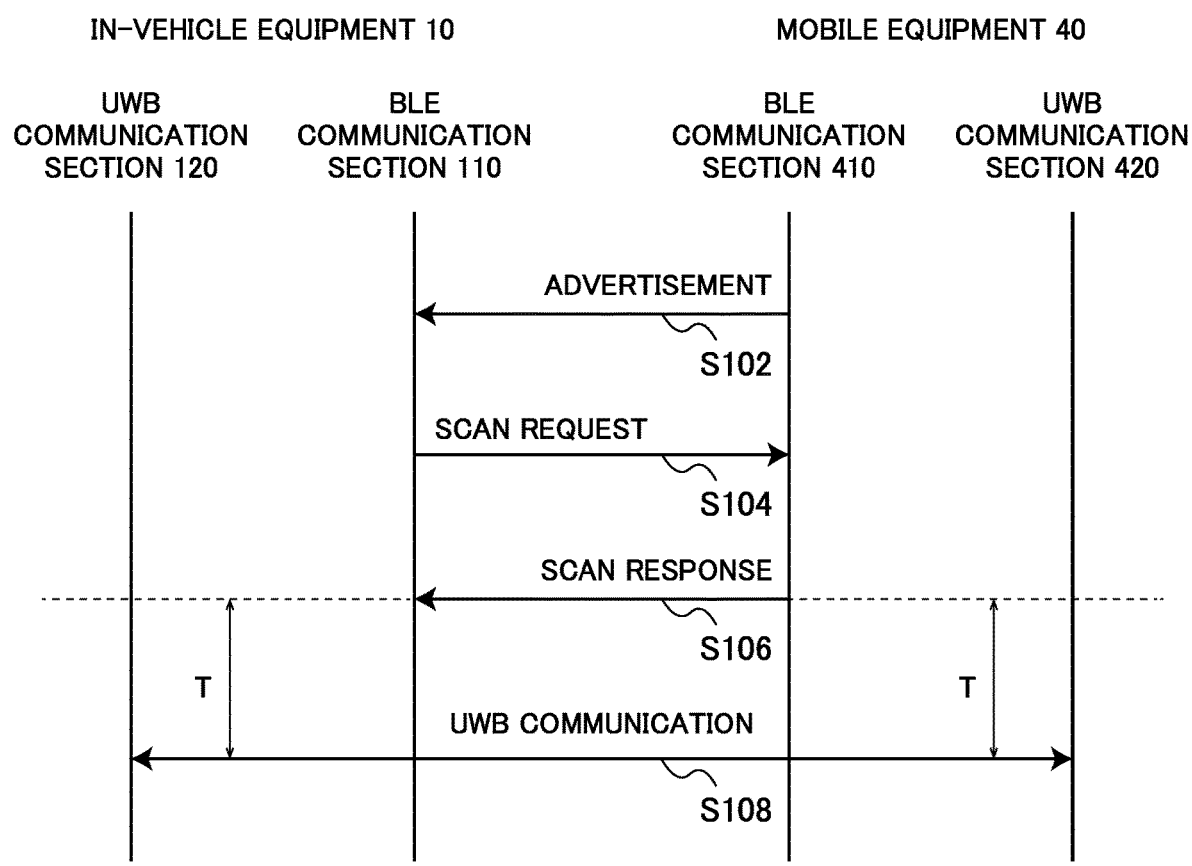
FIG. 2 is a sequence diagram illustrating an example of a communication sequence of the system 1 according to the embodiment.

FIG. 2 is a sequence diagram illustrating the example of the communication sequence of the system 1 according to the present embodiment.

Note that FIG. 2 illustrates the example of a case where the mobile equipment 40 operates as a slave of BLE communication, and the in-vehicle equipment 10 operates as a master.

The master that takes a longer time for a standby state to receive an advertisement consumes greater electric power than that of the slave that transmits the advertisement. Hence, it is possible to suppress consumption of the battery 440 and effectively extend an available time of the mobile equipment 40 by making the mobile equipment 40 the slave.

In a case of the example illustrated in FIG. 2, the BLE communication section 410 of the mobile equipment 40 first transmits the advertisement at a predetermined cycle under control of the control section 430 (S102).

The above advertisement may include an eigenvalue allocated to the mobile equipment 40, an eigenvalue allocated to the in-vehicle equipment 10 that is specified in advance as an authorized communication party, and an eigenvalue of the movable body 30.

When the BLE communication section 110 has received the advertisement in step S102, the control section 130 may decide whether or not the mobile equipment 40 is the authorized communication party based on the above-described information included in the advertisement.

In this regard, when the mobile equipment 40 that has transmitted the advertisement is verified as the authorized communication party, the control section 130 causes the BLE communication section 110 to transmit a scan request as a request signal (S104).

Next, the control section 430 of the mobile equipment 40 causes the BLE communication section 410 to transmit a scan response as a response to the scan request based on that the BLE communication section 410 has received the scan request in step S104 (S106).

The above scan response may include the key information used for encryption of UWB communication that comes after BLE communication.

The above key information is, for example, a random number.

Furthermore, the control section 430 of the mobile equipment 40 controls the UWB communication section 420 to start UWB communication after a fixed time T passes after causing the BLE communication section 410 to transmit the scan response in step S106 (S108).

For example, the control section 430 may cause the UWB communication section 420 to transmit a first signal of UWB communication after the fixed time T passes after causing the BLE communication section 410 to transmit the scan response in step S106.

On the other hand, the control section 430 may perform control to cause the UWB communication section 420 to transition to a signal reception standby state after the fixed time T passes after causing the BLE communication section 410 to transmit the scan response in step S106.

Control of the control section 430 is determined according to a UWB communication sequence.

In this regard, even when the control section 430 performs one of the above-described control, the control section 430 performs control to transmit and receive information that is encrypted by using the key information included in the response signal (the scan response in the example illustrated in FIG. 2) during UWB communication.

For example, the control section 430 may encrypt a signal to be transmitted and decode a signal to be received during UWB communication by using the above key information, an eigenvalue allocated in advance, and a hash function shared in advance.

Similarly, the control section 130 of the in-vehicle equipment 10 controls the UWB communication section 120 to start UWB communication after the fixed time T passes after the BLE communication section 110 receives the scan response in step S106 (S108).

For example, the control section 130 may control the UWB communication section 120 to transition to the reception standby state after the fixed time T passes after the BLE communication section 110 receives the scan response in step S106.

On the other hand, the control section 130 may cause the UWB communication section 120 to transmit the first signal of UWB communication after the fixed time T passes after the BLE communication section 110 receives the scan response in step S106.

Control of the control section 130 is determined according to the UWB communication sequence.

In this regard, even when the control section 130 performs one of the above-described control, the control section 130 performs control to transmit and receive the information that is encrypted by using the key information included in the response signal (the scan response in the example illustrated in FIG. 2) during UWB communication.

For example, the control section 130 may encrypt a signal to be transmitted and decode a signal to be received during UWB communication by using the above key information, an eigenvalue allocated in advance, and a hash function shared in advance.

The example of the communication sequence of the system 1 according to the present embodiment has been described above citing the example. According to the above-described communication sequence, it is possible to share the key information used for encryption of UWB communication without establishing connection of BLE communication, and furthermore synchronize start timings of UWB communication.

Accordingly, it is possible to avoid a decrease in responsiveness of the entire communication sequence, and effectively reduce power consumption of BLE communication and UWB communication.

Next, a control flow that focuses upon the control section 130 of the in-vehicle equipment 10 will be more specifically described.

Figure 3:
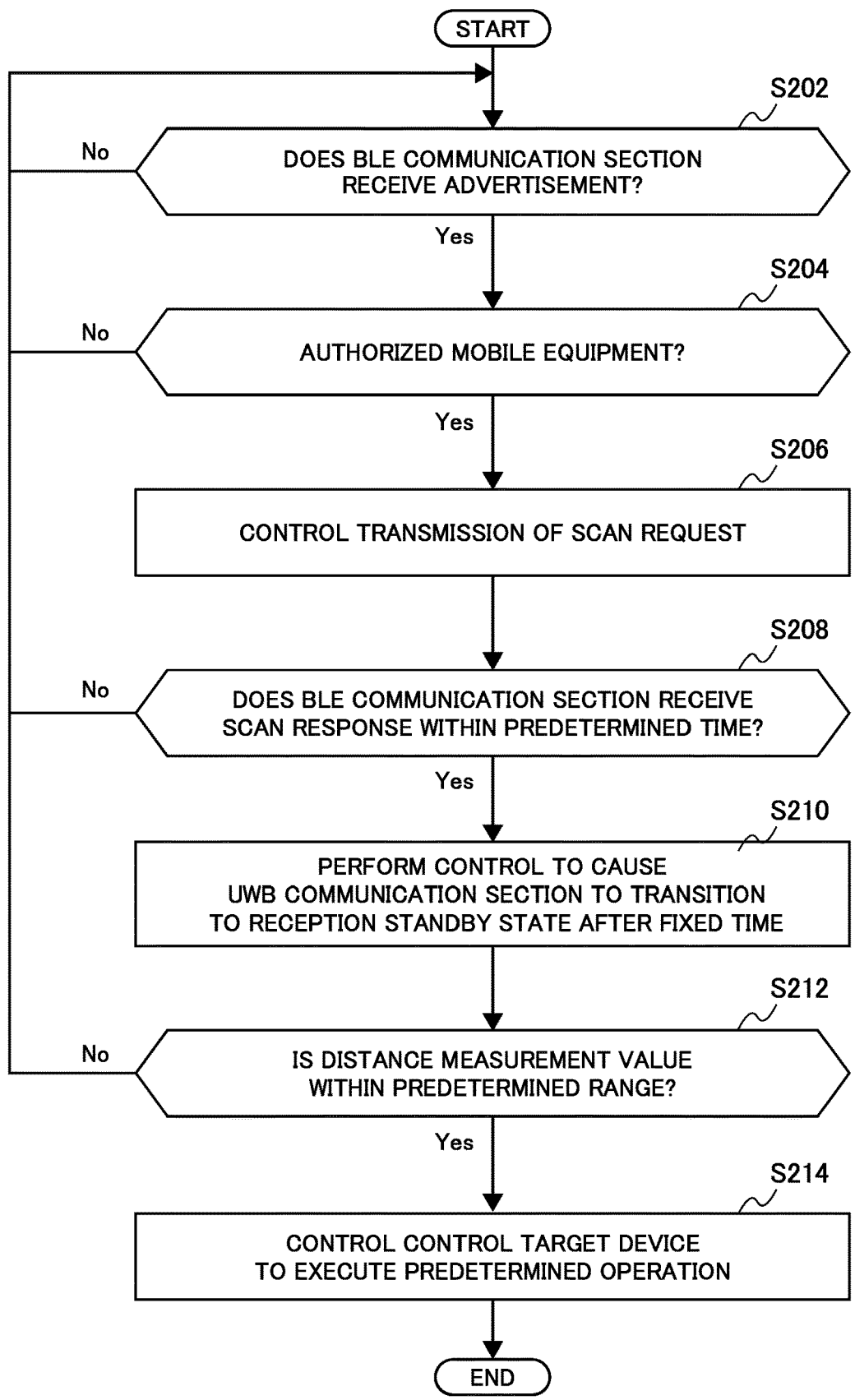
FIG. 3 is a flowchart illustrating an example of a control flow of a control section 130 according to the embodiment.

FIG. 3 is a flowchart illustrating an example of the control flow of the control section 130 according to the present embodiment.

Note that FIG. 3 illustrates the example of a case where the BLE communication section 110 of the in-vehicle equipment 10 operates as a master.

Furthermore, FIG. 3 illustrates the example of the case where the UWB communication section 420 of the mobile equipment 40 transmits the first signal of UWB communication.

Furthermore, FIG. 3 illustrates the example of the case where the control section 130 controls the operation of the control target device 20 based on a result (distance measurement value) of distance measurement that uses UWB communication.

As illustrated in FIG. 3, the control section 130 of the in-vehicle equipment 10 first decides whether or not the BLE communication section 110 has received the advertisement (S202).

The control section 130 may repeatedly execute the decision in step S102 until the BLE communication section 110 receives the advertisement.

On the other hand, when the BLE communication section 110 has received the advertisement (S202: Yes), the control section 130 decides whether or not the mobile equipment 40 that has transmitted the advertisement is an authorized communication party based on information included in the advertisement (S204).

In this regard, when the mobile equipment 40 that has transmitted the advertisement is not verified as the authorized communication party (S204: No), the control section 130 may return to step S102.

On the other hand, when the mobile equipment 40 that has transmitted the advertisement is verified as the authorized communication party (S204: Yes), the control section 130 causes the BLE communication section 110 to transmit the scan request (S206).

Next, the control section 130 decides whether or not the BLE communication section 110 has received the scan response within a predetermined time (S208).

In this regard, when the BLE communication section 110 cannot receive the scan response within the predetermined time (S208: No), the control section 130 may return to step S102.

On the other hand, when the BLE communication section 110 has received the scan response within the predetermined time (S208: Yes), the control section 130 controls the UWB communication section 120 to transition to the reception standby time the fixed time after reception of the scan response (S210).

Next, after step S210, the control section 130 decides whether or not the result (distance measurement value) of distance measurement performed between the UWB communication section 120 and the UWB communication section 420 is within a predetermined range (S212).

In this regard, when the distance measurement value is not within the predetermined range (S212: No), the control section 130 may return to step S102.

On the other hand, when the distance measurement value is within the predetermined range (S212: Yes), the control section 130 controls the control target device 20 to execute the predetermined operation (S214).

The control flow of the control section 130 according to the present embodiment has been described citing the example.

Note that various sequences may be adopted for distance measurement performed between the UWB communication section 120 and the UWB communication section 420, and examples of various sequences will be cited.

Distance measurement according to the present embodiment may be executed based on, for example, a first distance measurement signal transmitted by one of the UWB communication section 120 and the UWB communication section 420, and a second distance measurement signal transmitted as a response to the first distance measurement signal by the other one of the UWB communication section 120 and the UWB communication section 420.

Hereinafter, a case is assumed where the UWB communication section 420 transmits the first distance measurement signal as the first signal of UWB communication, and the UWB communication section 120 transmits the second distance measurement signal as the response to the received first distance measurement signal.

In this case, the UWB communication section 420 can calculate a distance measurement value that is an estimated value of a distance between the UWB communication section 420 and the UWB communication section 120 based on a time $\Delta T1$ that is from a time at which the UWB communication section 420 has transmitted the first distance measurement signal to a time at which the UWB communication section 420 receives the second distance measurement signal, and a time $\Delta T2$ from a time at which the UWB communication section 120 has received the first distance measurement signal to a time at which the UWB communication section 120 transmits the second distance measurement signal.

More specifically, the UWB communication section 420 can calculate a time required for propagation of the first distance measurement signal and the second distance measurement signal (i.e., a time required for round-trip communication) by subtracting the time $\Delta T2$ from the time $\Delta T1$. Furthermore, it is possible to calculate a time required for propagation of one of the first distance measurement signal and the second distance measurement signal (i.e., a time required for one-way communication) by dividing the time by 2.

Furthermore, the UWB communication section 420 can calculate the distance measurement value by multiplying a value of $(\Delta T1-\Delta T2)/2$ with a speed of the signal.

In this case, the UWB communication section 420 may transmit the calculated distance measurement value to the UWB communication section 120.

Note that, in a case of the above-cited example, the UWB communication section 120 may include information related to the time $\Delta T2$ in the second distance measurement signal to transmit, or include the information related to the time $\Delta T2$ in a signal different from the second distance measurement signal to transmit.

On the other hand, the UWB communication section 120 can also calculate the distance measurement value by receiving information related to the time $\Delta T1$ from the UWB communication section 420.

The distance measurement sequence according to the present embodiment can be flexibly altered.

Supplementary Explanation

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

Furthermore, a series of processes of each device described in this description may be realized by each program stored in a non-transitory computer readable storage medium. Each program is read on an RAM when, for example, executed by a computer, and is executed by a processor such as a CPU. The above recording medium is, for example, a magnetic disk, an optical disk, a magneto-optical disk, or a flash memory. Furthermore, the above programs may be distributed via, for example, a network without using the recording medium.

What is claimed is:
1. A communication device comprising:
a Bluetooth Low Energy (BLE) communication section configured to perform BLE communication with another communication device different from the communication device and to obtain key information, the BLE communication being wireless communication conforming to BLE communication standards;
an Ultra Wide Band (UWB) communication section configured to perform UWB communication with the other communication device, the UWB communication being wireless communication conforming to UWB communication standards; and
a control section configured to control the BLE communication of the BLE communication section and the UWB communication of the UWB communication section,
wherein the control section performs control to start the UWB communication based on a response signal transmitted by one of the BLE communication section and the other communication device as a response to a request signal transmitted by other one of the BLE communication section and the other communication device during the BLE communication, and performs control to trigger the UWB communication to perform encrypted communication using the key information obtained via the BLE communication.
2. The communication device according to claim 1, wherein the control section performs control to start the UWB communication a fixed time after transmission or reception of the response signal.

3. The communication device according to claim 1, wherein the control section performs control to transmit and receive information encrypted by using the key information included in the response signal during the UWB communication.

4. The communication device according to claim 1, wherein the control section causes the BLE communication section to transmit a scan request as the request signal based on that the BLE communication section has received an advertisement transmitted by the other communication device.

5. The communication device according to claim 4, wherein the control section performs control to cause the UWB communication section to transition to a reception standby state a fixed time after the BLE communication section receives a scan response as the response signal.

6. The communication device according to claim 1, wherein the UWB communication is used for a process of estimating a positional relationship between the UWB communication section and the other communication device.

7. The communication device according to claim 6, wherein the process of estimating the positional relationship includes distance measurement for estimating a distance between the UWB communication section and the other communication device.

8. The communication device according to claim 6, wherein the control section causes a control target device to execute a predetermined operation when a result of the process of estimating the positional relationship is within a predetermined range.

9. The communication device according to claim 1, wherein the communication device is mounted on a movable body.

10. The communication device according to claim 1, wherein the other communication device is driven by a battery.

11. A non-transitory computer readable storage medium having a program stored therein, the program causing a computer to realize:
a Bluetooth Low Energy (BLE) communication function configured to perform BLE communication with another communication device and to obtain key information, the BLE communication being wireless communication conforming to BLE communication standards;
an Ultra Wide Band (UWB) communication function configured to perform UWB communication with the other communication device, the UWB communication being wireless communication conforming to UWB communication standards; and
a control function configured to control the BLE communication and the UWB communication,
wherein the program causes the control function to perform control to start the UWB communication based on a response signal transmitted by one of the BLE communication function and the other communication device as a response to a request signal transmitted by other one of the BLE communication function and the other communication device during the BLE communication, and to perform control to trigger the UWB communication to perform encrypted communication using the key information obtained via the BLE communication.

12. A system comprising:
a first communication device; and
a second communication device, wherein the first communication device includes
a Bluetooth Low Energy (BLE) communication section configured to perform BLE communication with the second communication device and to obtain key information, the BLE communication being wireless communication conforming to BLE communication standards;
an Ultra Wide Band (UWB) communication section configured to perform UWB communication with the second communication device, the UWB communication being wireless communication conforming to UWB communication standards; and
a control section configured to control the BLE communication of the BLE communication section and the UWB communication of the UWB communication section, and
the control section performs control to start the UWB communication based on a response signal transmitted by one of the BLE communication section and the second communication device as a response to a request signal transmitted by other one of the BLE communication section and the second communication device during the BLE communication, and performs control to trigger the UWB communication to perform encrypted communication using the key information obtained via the BLE communication.

* * * * *